United States Patent
Wang et al.

(10) Patent No.: US 11,769,961 B2
(45) Date of Patent: Sep. 26, 2023

(54) ELECTRICAL CONNECTOR MODULE AND HEAT DISSIPATION HOUSING

(71) Applicant: Dongguan Luxshare Technologies Co., Ltd, Dongguan (CN)

(72) Inventors: XiaoKai Wang, Dongguan (CN); TieSheng Li, Dongguan (CN); XiaoPing Wu, Dongguan (CN); BaiYu Duan, Dongguan (CN)

(73) Assignee: Dongguan Luxshare Technologies Co., Ltd, Dongguan (CN)

(*) Notice: Subject to any disclaimer, the term of this patent is extended or adjusted under 35 U.S.C. 154(b) by 225 days.

(21) Appl. No.: 17/463,725

(22) Filed: Sep. 1, 2021

(65) Prior Publication Data
US 2022/0085544 A1 Mar. 17, 2022

(30) Foreign Application Priority Data

Sep. 14, 2020 (CN) .......................... 202010961876.8

(51) Int. Cl.
*H01R 13/00* (2006.01)
*H01R 13/518* (2006.01)
(Continued)

(52) U.S. Cl.
CPC ............. *H01R 13/518* (2013.01); *F28F 3/06* (2013.01); *H01R 12/716* (2013.01); *H01R 13/659* (2013.01)

(58) Field of Classification Search
CPC .. H01R 13/516; H01R 13/518; H01R 13/659; H01R 12/712; H01R 12/716; F28F 3/022; F28F 3/06
(Continued)

(56) References Cited

U.S. PATENT DOCUMENTS 7,773,379 B2 * 8/2010 Bryan ................ H05K 7/20854
361/715
9,590,409 B2   3/2017 Faulkner
(Continued)

FOREIGN PATENT DOCUMENTS

CN      100483857 C    4/2009
CN      203839574 U    9/2014
(Continued)

*Primary Examiner* — Khiem M Nguyen
(74) *Attorney, Agent, or Firm* — Birch, Stewart, Kolasch & Birch, LLP

(57) ABSTRACT

The present disclosure provide an electrical connector module and a heat dissipation housing. The electrical connector module comprises a heat dissipation housing and a plurality of electrical connectors. The heat dissipation housing comprises a metal housing, a positioning component, a plurality of heat dissipating members, and a plurality of buckling members. The metal housing comprises a housing body, which comprises a disposing surface, an accommodating space, and a plurality of first openings. The plurality of first openings is disposed on the disposing surface and is in communicating with the accommodating space. The positioning component comprises a component body and a plurality of positioning members. The component body is disposed on the disposing surface and comprises a plurality of second openings corresponding to the plurality of first openings respectively. Two opposite side edges of each of the second openings are respectively connected with at least one of the positioning members.

13 Claims, 4 Drawing Sheets

(51) Int. Cl.
*F28F 3/06* (2006.01)
*H01R 12/71* (2011.01)
*H01R 13/659* (2011.01)

(58) Field of Classification Search
USPC .................................................. 439/485, 487
See application file for complete search history.

(56) References Cited

U.S. PATENT DOCUMENTS

2022/0085544 A1\* 3/2022 Wang .................... H01R 13/518
2022/0087070 A1\* 3/2022 Wang .................... H01R 13/502

FOREIGN PATENT DOCUMENTS

| CN | 204166166 U | 2/2015 |
| CN | 108738278 A | 11/2018 |
| TW | 297558 U | 2/1997 |
| TW | 454975 U | 9/2001 |
| TW | 579003 U | 3/2004 |

\* cited by examiner

ELECTRICAL CONNECTOR MODULE AND HEAT DISSIPATION HOUSING

CROSS-REFERENCE TO RELATED APPLICATION

This application claims the priority benefit of Chinese Patent Application Serial Number 202010961876.8, filed on Sep. 14, 2020, the full disclosure of which is incorporated herein by reference.

BACKGROUND

Technical Field

The present disclosure relates to the technical field of electrical connector, particularly to a positioning component that folds the edge of a plurality of second opening of a metal housing upward for positioning heat dissipating housing of a plurality of heat dissipating members that dissipates the heat of an electrical connector and for positioning the electrical connector module comprising the heat dissipation housing.

Related Art

Conventional electrical connector module having a plurality of high power electrical connectors are usually provided with a metal housing for accommodating the plurality of electrical connectors and supporting the installation of a plurality of heat dissipating members for dissipating heat from electrical connectors. The metal housing also performs electromagnetic shielding. To secure a plurality of heat dissipating members on the metal housing and maintain thermal contact with electrical connector, a positioning bump is provided on two opposite outer side surfaces of the metal housing in conventional configurations, wherein one buckling member simultaneously abuts against a plurality of heat dissipating members while two ends of the buckling member are respectively positioned and buckled with the positioning bumps disposed on two opposite outer side surfaces of the metal housing to position the heat dissipating member on the metal housing and to apply pressure onto the heat dissipating member. Thus, the heat dissipating member can be pressed against the electrical connector to form a thermal contact configuration with excellent thermal conductivity. However, conventional buckling members press-fit all the heat dissipating members at one time and must be positioned in accordance with the specific size of the corresponding metal housing, so buckling members corresponding to different sizes of metal housing must be produced individually when the number of electrical connectors varies and metal housing of different sizes are used accordingly. Apparently, it can be seen that the overall cost for electrical connector manufacturing would be increased and the flexibility of design would be very limited.

SUMMARY

The embodiments of the present disclosure provide an electrical connector module and a heat dissipation housing to solve the problem of increased cost and limited design flexibility due to buckling members of conventional heat dissipation housing that should correspond to the size of the metal housing.

The present disclosure provides a heat dissipation housing, comprising a metal housing, a positioning component, a plurality of heat dissipating members, and a plurality of buckling members. The metal housing comprises a housing body, which comprises a disposing surface, an accommodating space, and a plurality of first openings. The plurality of first openings is disposed on the disposing surface and is in communicating with the accommodating space. The positioning component comprises a component body and a plurality of positioning members. The component body is disposed on the disposing surface and comprises a plurality of second openings corresponding to the plurality of first openings respectively. Two opposite side edges of each of the second openings are respectively connected with at least one of the positioning members. The plurality of heat dissipating members are disposed in the plurality of second openings, respectively. The plurality of heat dissipating members pass through the plurality of first openings and the plurality of second openings. Each of the heat dissipating members is disposed between the two positioning members on the two side edges of each of the second openings. Each of the plurality of buckling members allows each of the heat dissipating members to be connected with and positioned at the two positioning members on two side edges of each of the second openings.

The present disclosure provides an electrical connector module, comprising a heat dissipation housing and a plurality of electrical connectors. The plurality of electrical connectors are disposed in the accommodating space of the housing body. The plurality of electrical connectors respectively correspond to the plurality of first openings. The plurality of heat dissipating members are in thermal contact with the plurality of electrical connectors through the plurality of first openings and the plurality of second openings.

In the embodiments of the present disclosure, by disposing the positioning component of the heat dissipating member and by disposing the positioning member on two opposite side edges of each of the second openings, the buckling member needs only to be produced according to the size of the second opening. Even the metal housing could be in a variety of sizes in accordance with the number of electrical connectors, there is still no need to produce multiple buckling members corresponding to the sizes of metal housing as in the prior art since it is possible to use a single size buckling member with the number of which need only to be adjusted appropriately. Besides, since the size of the second opening of the positioning component could correspond to the size of the first opening, there would be great flexibility in designing of products.

It should be understood, however, that this summary may not contain all aspects and embodiments of the present disclosure, that this summary is not meant to be limiting or restrictive in any manner, and that the disclosure as disclosed herein will be understood by one of ordinary skill in the art to encompass obvious improvements and modifications thereto.

BRIEF DESCRIPTION OF THE DRAWINGS

The features of the exemplary embodiments believed to be novel and the elements and/or the steps characteristic of the exemplary embodiments are set forth with particularity in the appended claims. The Figures are for illustration purposes only and are not drawn to scale. The exemplary embodiments, both as to organization and method of operation, may best be understood by reference to the detailed description which follows taken in conjunction with the accompanying drawings in which:

DETAILED DESCRIPTION OF THE EMBODIMENTS

The present disclosure will now be described more fully hereinafter with reference to the accompanying drawings, in which exemplary embodiments of the disclosure are shown. This present disclosure may, however, be embodied in many different forms and should not be construed as limited to the embodiments set forth herein. Rather, these embodiments are provided so that this present disclosure will be thorough and complete, and will fully convey the scope of the present disclosure to those skilled in the art.

Certain terms are used throughout the description and following claims to refer to particular components. As one skilled in the art will appreciate, manufacturers may refer to a component by different names. This document does not intend to distinguish between components that differ in name but function. In the following description and in the claims, the terms "include/including" and "comprise/comprising" are used in an open-ended fashion, and thus should be interpreted as "including but not limited to". "Substantial/substantially" means, within an acceptable error range, the person skilled in the art may solve the technical problem in a certain error range to achieve the basic technical effect.

The following description is of the best-contemplated mode of carrying out the disclosure. This description is made for the purpose of illustration of the general principles of the disclosure and should not be taken in a limiting sense. The scope of the disclosure is best determined by reference to the appended claims.

Moreover, the terms "include", "contain", and any variation thereof are intended to cover a non-exclusive inclusion. Therefore, a process, method, object, or device that includes a series of elements not only includes these elements, but also includes other elements not specified expressly, or may include inherent elements of the process, method, object, or device. If no more limitations are made, an element limited by "include a/an . . . " does not exclude other same elements existing in the process, the method, the article, or the device which includes the element.

Figure 1:
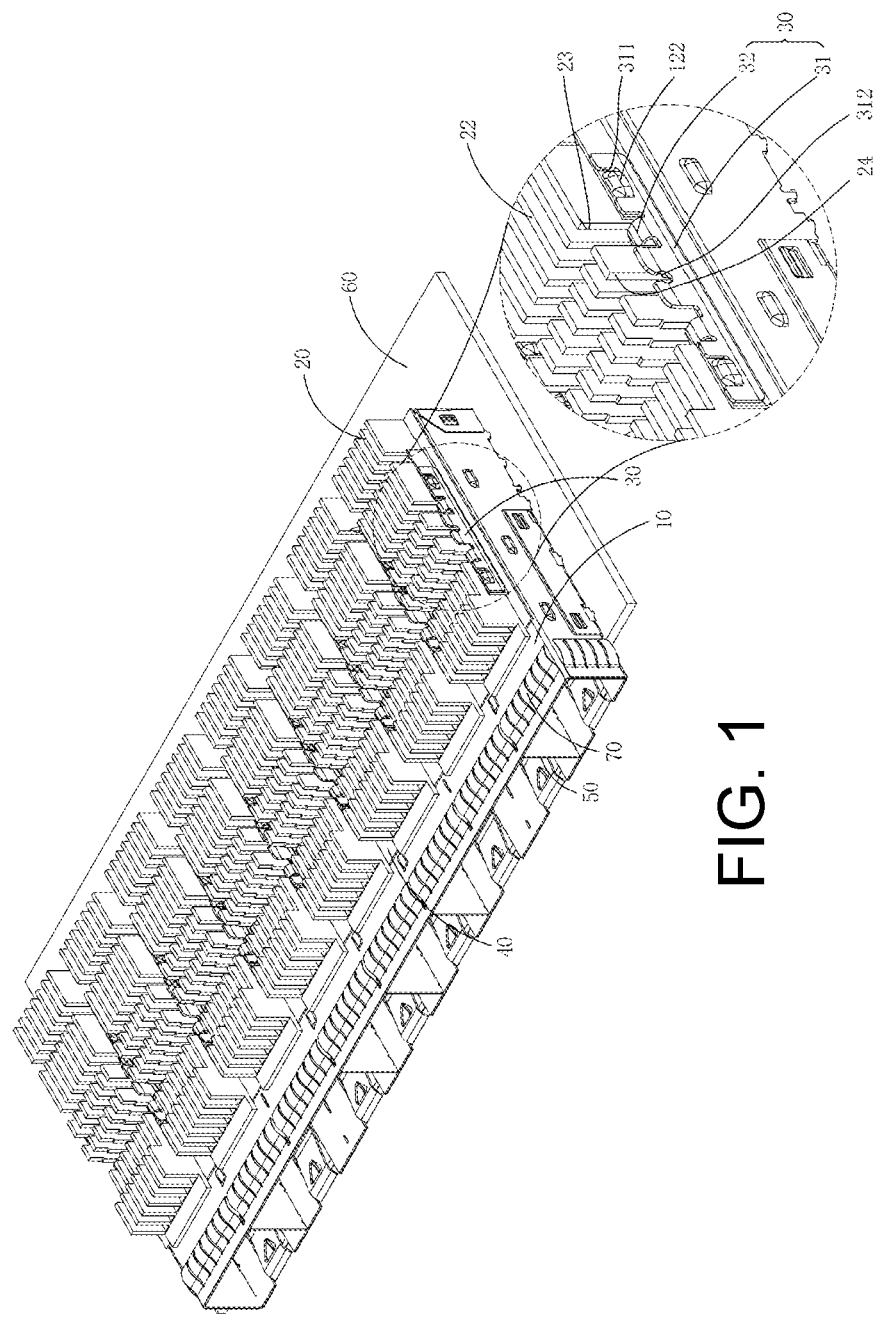
FIG. 1 is a perspective view and a partially enlarged view of an electrical connector module and a heat dissipation housing of an embodiment of the present disclosure.
Figure 2:
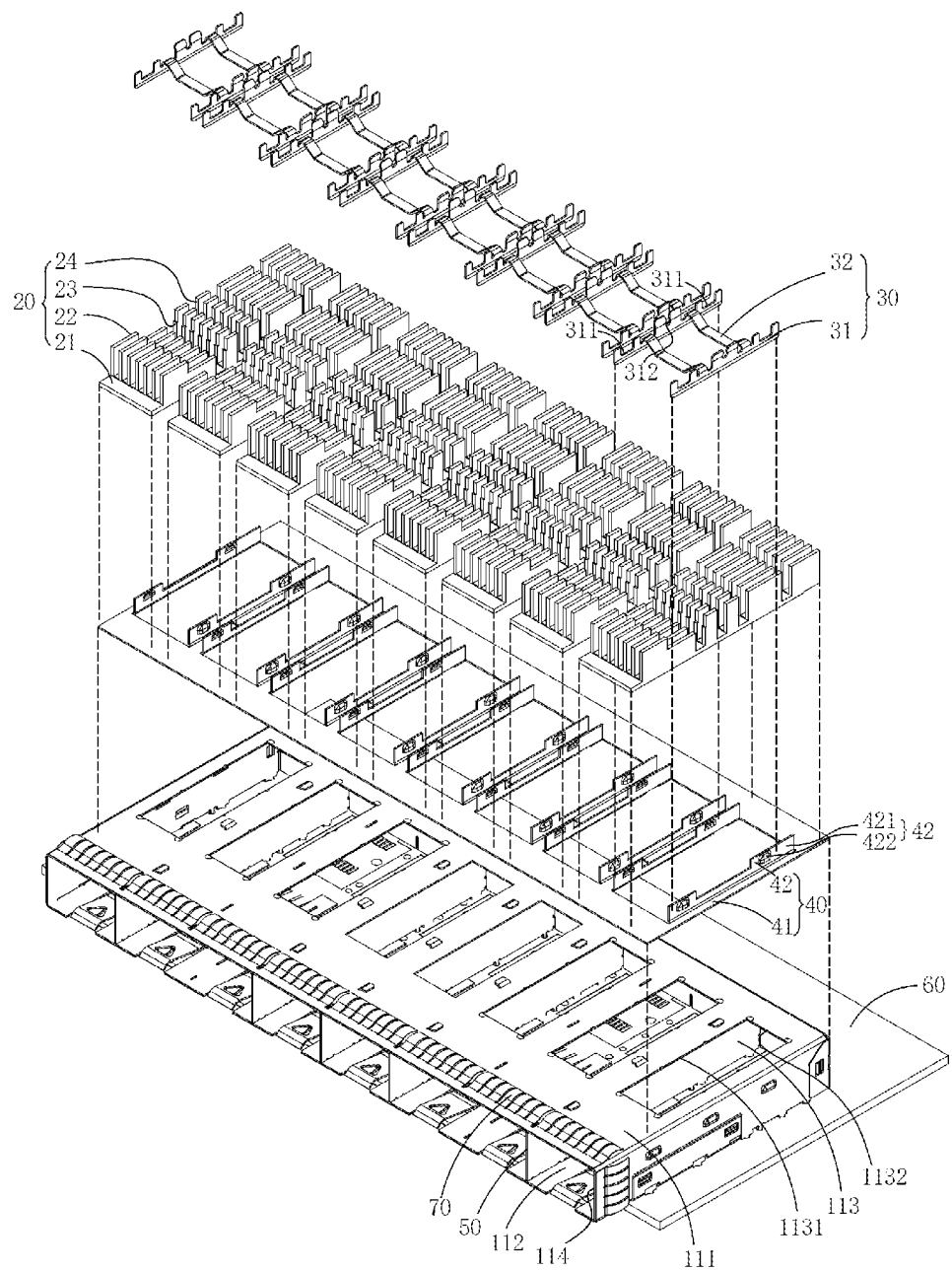
FIG. 2 is an exploded view of the electrical connector module and the heat dissipation housing of FIG. 1.
Figure 3:
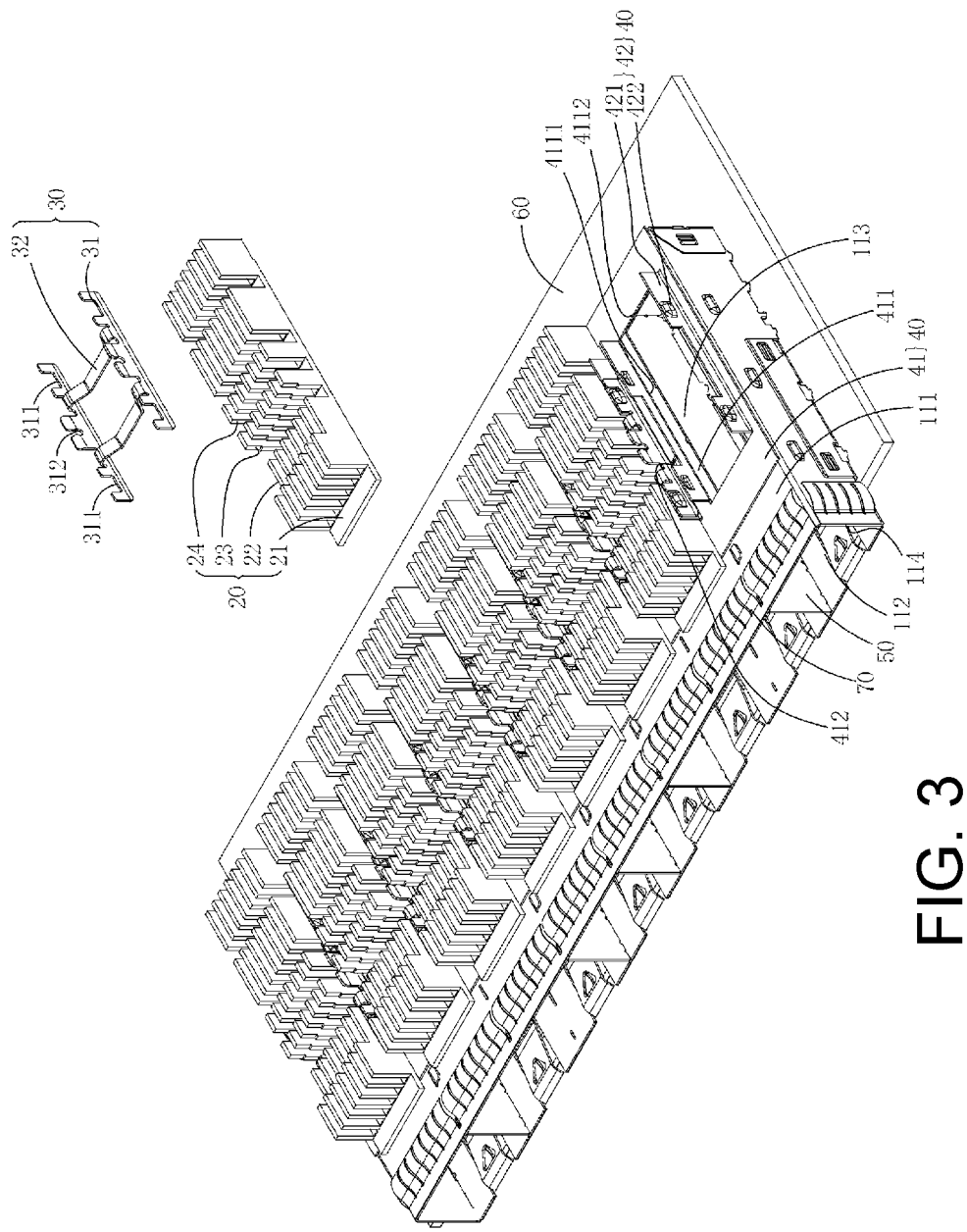
FIG. 3 is a partially exploded view of the electrical connector module and the heat dissipation housing of FIG. 1.
Figure 4:
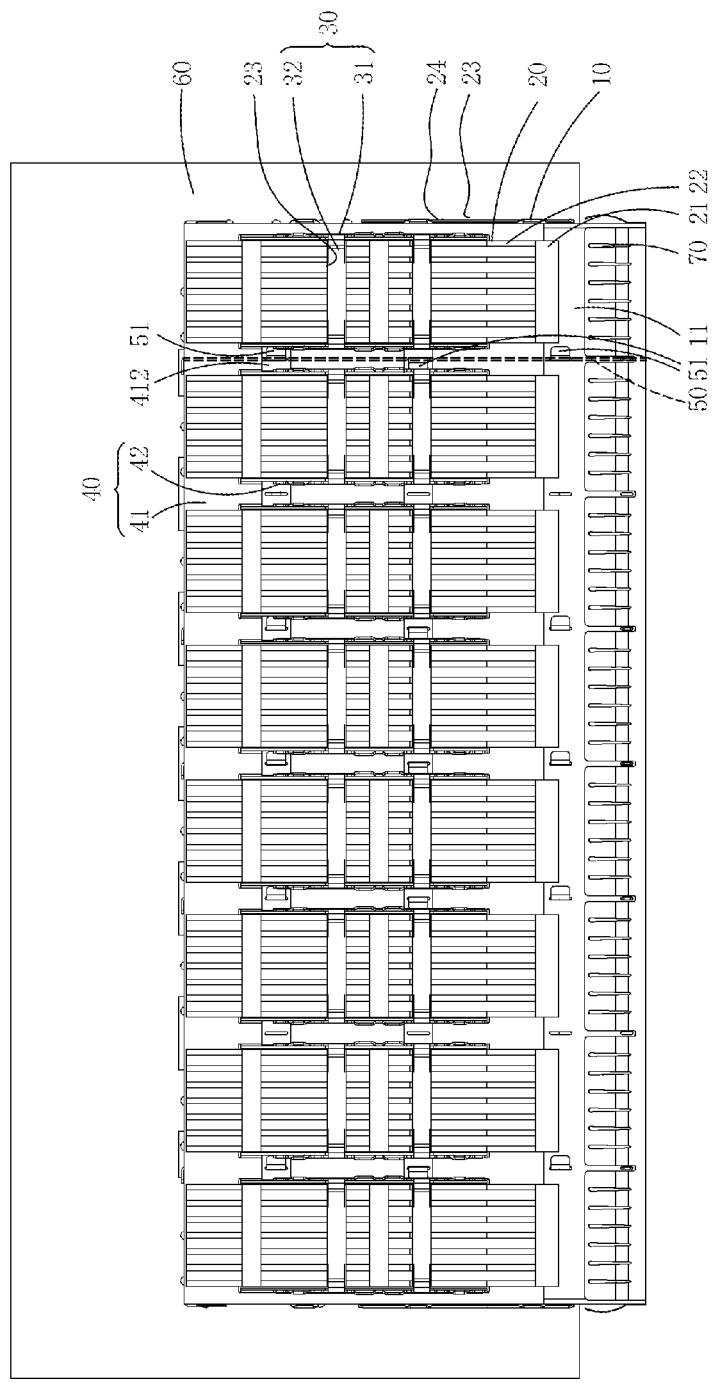
FIG. 4 is a top view of the electrical connector module and the heat dissipation housing of FIG. 1.

FIG. 1 is a perspective view and a partially enlarged view of an electrical connector module and a heat dissipation housing of an embodiment of the present disclosure. FIG. 2 to FIG. 4 are exploded view, partially exploded view, and top view of the electrical connector module and the heat dissipation housing of FIG. 1. As shown in the figures, the present embodiment provides an electrical connector module, which comprises a heat dissipation housing and a plurality of electrical connectors. The heat dissipation housing comprises a metal housing 10, a plurality of heat dissipating members 20, a plurality of buckling members 30, and a positioning component 40. The electrical connector is disposed in the metal housing 10, and the positioning component 40 is disposed on the metal housing 10 by, such as, soldering, gluing, and etc., which is not limited thereto. The plurality of heat dissipating members 20 are disposed at the positioning component 40, and each of the heat dissipating members 20 is positioned on the positioning component 40 by one buckling member 30. The buckling member 30 presses the heat dissipating member 20 to keep the heat dissipating member 20 in excellent thermal contact with the electrical connector. In FIG. 1 to FIG. 4, the electrical connector is omitted to clearly present the configuration of the metal housing 10, the heat dissipating member 20, the buckling member 30, and the positioning component 40.

As shown in FIG. 1, FIG. 2, and FIG. 3, the metal housing 10 comprises a housing body 11 comprising a disposing surface 111, an accommodating space 112, and a plurality of first openings 113. The plurality of first openings 113 are disposed on the disposing surface 111 and are in communicating with the accommodating space 112. In this embodiment, the housing body 11 is a rectangular parallelepiped whose top surface is the disposing surface 111 where the plurality of first openings 113 are disposed. The shape of the first opening 113 could match the shape of the electrical connector and the heat dissipating member 20. In this embodiment, each of the first openings 113 is rectangular, and each of the first openings 113 comprises two opposite long side edges 1131 and two opposite short side edges 1132. The length of the long side edge 1131 is longer than the length of the short side edge 1132 herein.

As shown in FIG. 2 and FIG. 3, the positioning component 40 comprises a component body 41 and a plurality of positioning members 42. The component body 41 is disposed on the disposing surface 111 and comprises a plurality of second openings 411. The plurality of second openings 411 respectively correspond to the plurality of first openings 113, and the opening area of the second opening 411 is greater than the opening area of the first opening 113. Two opposite side edges of each of the second openings 411 are respectively connected with at least one of the positioning members 42. The component body 41 is secured to the disposing surface 111 of the housing body 11 by, for example, soldering or gluing. The second opening 411 comprises two opposite long side edges 4111 and two opposite short side edges 4112. The positioning member 42 is connected with the two opposite long side edges 4111 of the second opening 411. In this embodiment, the positioning member 42 is a sheet-structured member formed by bending upward a part of the protruding of the component body 41 disposed on the long side edge 4111 of the second opening 411. Thus, in this embodiment, the positioning member 42 and the component body 41 are integrally formed.

As shown in FIG. 3, each of the positioning members 42 comprises a positioning sheet body 421 and a positioning bump 422. The positioning sheet body 421 is connected to the two opposite long side edges 4111 of the second opening 411 and extends toward in a direction away from the disposing surface 111. The positioning bump 422 is disposed on a surface of the positioning sheet body 421 away from the second opening 411 and protrudes in a direction away from the second opening 411. The buckling member 30 is buckled with the positioning bump 422.

The plurality of electrical connectors are disposed in the accommodating space 112 of the housing body 11 and correspond to the plurality of first openings 113, respectively. In this embodiment, the plurality of electrical connectors are parallelly arranged in the accommodating space 112, and the long side edges 1131 of the plurality of first openings 113 and the long side edges 4111 of the plurality of second openings 411 are also parallelly arranged. Besides, as the position of the first opening 113 corresponds to the electrical connector, the housing of the electrical connector can be exposed through the first opening 113 and the second opening 411. The metal housing 10 further comprises a plugging opening 114, which is disposed on a plane orthogonal to the disposing surface 111. The interface of the electrical connector can be exposed through the plugging opening 114. Each of the electrical connectors comprises a plurality of terminals corresponding to the plugging opening 114 so that other corresponding plurality of electrical connectors could pass through the plugging opening 114 to be plugged into the electrical connector disposed in the metal housing 10. In this embodiment, the electrical connector in the metal housing 10 is a female electrical connector.

As shown in FIG. 1, FIG. 3, and FIG. 4, the plurality of heat dissipating members 20 are respectively disposed in the plurality of second openings 411 and are respectively in thermal contact with the plurality of electrical connectors through the plurality of first openings 113 and the plurality of second openings 411. Each of the heat dissipating members 20 is disposed between the two positioning members 42 on the two opposite long side edges 4111 of each of the second openings 411. In this embodiment, each of the heat dissipating members 20 comprises a base 21 and a plurality of heat dissipating fins 22. The base 21 is rectangular and is disposed on the component body 41 of the positioning component 40. The base 21 covers the second opening 411 and is in contact with the housing of the electrical connector exposed from the second opening 411 through the second opening 411, thereby forming a thermal conductive configuration. In the electrical connector, the heat generated during the transmission of high-frequency signals is conducted from the housing of the electrical connector to the base 21 and the heat dissipating fins 22 of the heat dissipating member 20, then is carried away by air flowing through the heat dissipating fins 22 in the manner of thermal convection from the heat dissipating fins 22.

As shown in FIG. 1, FIG. 3, and FIG. 4, each of the buckling members 30 allows each of the heat dissipating members 20 to be connected with others and position each of the heat dissipating members 20 at the two positioning members 42 on the two opposite long side edges 4111 of each of the second openings 411. As shown in FIG. 3, in this embodiment, the buckling member 30 comprises two positioning parts 31 and at least one limiting part 32. The two positioning parts 31 respectively correspond to the two positioning members 42 disposed on the two opposite long side edges 1131 of each of the first openings 113. The two positioning parts 31 are respectively buckled with the positioning bump 422 of the positioning member 42, and the limiting part 32 is connected with the two positioning parts 31. In this embodiment, the number of limiting parts 32 is two. The positioning part 31 is parallel to the long side edge 4111 of the second opening 411, and the limiting part 32 is parallel to the short side edge 4112 of the second opening 411.

As shown in FIG. 1 and FIG. 3, each of the heat dissipating members 20 is disposed between the two positioning parts 31 and between the limiting part 32 and the second opening 411. When the positioning part 31 is buckled with the positioning bump 422 of the positioning member 42, the limiting part 32 would be press-fitted on the heat dissipating member 20 to keep the heat dissipating member 20 in contact with the electrical connector to form a configuration of heat conduction described above. As shown in FIG. 3, the limiting part 32 is approximate shallow U-shaped, and the downward part at the center of the limiting part 32 can be press-fitted onto the heat dissipating member 20. Each heat dissipating members 20 comprises a limiting groove 23 disposed between two groups of adjacent heat dissipating fins 22. The limiting part 32 of the buckling member 30 passes through the limiting groove 23 and is press-fitted on the base 21 of the heat dissipating member 20. The extending direction of the limiting groove 23 is parallel to the short side edge 4112 of the second opening 411.

As shown in FIG. 1, FIG. 2, and FIG. 3, in this embodiment, the two positioning parts 31 are sheet-structured parts, and one side edge of which abuts against the component body 41 of the positioning component 40, and the other side edge away from the component body 41 comprises least one positioning gap 311. The at least one positioning gap 311 buckled with the positioning bump 422 on one end of the positioning bump 422 close to the component body 41 so that the positioning bump 422 could limit the positioning part 31 and could prevent the buckling member 30 from being detached from the positioning member 42 to have the buckling member 30 to be positioned at the positioning member 42. In this embodiment, each of the positioning parts 31 comprises two positioning gaps 311.

As shown in FIG. 3 and FIG. 4, each of the positioning parts 31 of the buckling member 30 further comprises a positioning notch 312 disposed on the same side as the positioning gap 311. The positioning notch 312 is used to position the light tube passing above the heat dissipating member 20. The heat dissipating member 20 is provided with a guiding groove 24 between the two limiting grooves 23. The guiding groove 24 allows the light tube to extend through the heat dissipating member 20 and be positioned in the positioning notch 312 of the positioning part 31 of the buckling member 30.

As shown in FIG. 1, FIG. 3, and FIG. 4, in this embodiment, the electrical connector module further comprises a plurality of partition plates 50 disposed in the accommodating space 112 of the housing body 11. The plurality of partition plates 50 divides the accommodating space 112 into a plurality of partitioned space. Each of the electrical connectors is disposed in the partitioned space between two adjacent partition plates 50. The partition plate 50 could be made of a conductive material to electromagnetically shield the adjacent electrical connector. Each of the partition plates 50 comprises a plurality of securing parts 51. The plurality of securing parts 51 pass through the housing body 11 and are secured on the disposing surface 111 between two adjacent first openings 113. In this embodiment, since the positioning part 31 of the buckling member 30 abuts against the disposing surface 111, the securing part 51 of the partition plate 50 respectively extend toward the positioning member 42 in an opposite direction. Thus, the positioning part 31 of the buckling member 30 is press-fitted on the securing part 51. As shown in FIG. 2 and FIG. 4, the component body 41 of the positioning component 40 further comprises a plurality of retaining holes 412, which correspond to the plurality of securing parts 51. When the positioning component 40 is secured on the disposing surface 111 of the housing body 11, the retaining holes 412 allow the securing parts 51 to pass through, so that the component body 41 of the positioning component 40 can be evenly secured on the disposing surface 111.

As shown in FIG. 1, FIG. 3, and FIG. 4, in this embodiment, the electrical connector module further comprises a circuit board 60, on which the metal housing is securely disposed through, for example, a plugging member having a fisheye component. The terminals of the plurality of electrical connectors are electrically connected to the circuit board 60 by soldering.

As shown in FIG. 1, FIG. 3, and FIG. 4, in this embodiment, the electrical connector module further comprises an elastic buckling member 70 disposed on the disposing surface 111 of the housing body 11. When the metal housing 10 is plugged into the housing of an electronic device, the elastic buckling member 70 would be used to buckle the metal housing 10 to abut against the housing of the electronic device.

In summary, embodiments of the present disclosure provide an electrical connector module and a heat dissipation housing. By disposing the positioning component of the heat dissipating member and by disposing the positioning member on two opposite side edges of each of the second openings, the buckling member needs only to be produced according to the size of the second opening. Even the metal housing could be in a variety of sizes in accordance with the number of electrical connectors, there is still no need to produce multiple buckling members corresponding to the sizes of metal housing as in the prior art since it is possible to use a single size buckling member with the number of which need only to be adjusted appropriately. Besides, since the size of the second opening of the positioning component could correspond to the size of the first opening, there would be great flexibility in designing of products.

It is to be understood that the term "comprises", "comprising", or any other variants thereof, is intended to encompass a non-exclusive inclusion, such that a process, method, article, or device of a series of elements not only comprise those elements but further comprises other elements that are not explicitly listed, or elements that are inherent to such a process, method, article, or device. An element defined by the phrase "comprising a . . . " does not exclude the presence of the same element in the process, method, article, or device that comprises the element.

Although the present disclosure has been explained in relation to its preferred embodiment, it does not intend to limit the present disclosure. It will be apparent to those skilled in the art having regard to this present disclosure that other modifications of the exemplary embodiments beyond those embodiments specifically described here may be made without departing from the spirit of the disclosure. Accordingly, such modifications are considered within the scope of the disclosure as limited solely by the appended claims.

What is claimed is:

1. A heat dissipation housing, comprising:
  a metal housing comprising a housing body comprising a disposing surface, an accommodating space and a plurality of first openings, the plurality of first openings being disposed on the disposing surface and being in communicating with the accommodating space;
  a positioning component comprising a component body and a plurality of positioning members, the component body being disposed on the disposing surface and comprising a plurality of second openings corresponding to the plurality of first openings respectively, two opposite side edges of each of the second openings being respectively connected with at least one of the positioning members;
  a plurality of heat dissipating members disposed in the plurality of second openings respectively, the plurality of heat dissipating members passing through the plurality of first openings and the plurality of second openings, each of the heat dissipating members being disposed between the two positioning members on the two side edges of each of the second openings; and
  a plurality of buckling members, each of which allowing each of the heat dissipating members to be connected with and positioned at the two positioning members on two side edges of each of the second openings.

2. The heat dissipation housing according to claim 1, wherein each of the positioning members comprises a positioning sheet body and a positioning bump; the positioning sheet body is connected to the two side edges of each of the second openings and extends in a direction away from the disposing surface; the positioning bump is disposed on a surface of the positioning sheet body away from each of the second openings; the buckling member is buckled with the positioning bump.

3. The heat dissipation housing according to claim 2, wherein the plurality of the positioning member and the component body are integrally formed.

4. The heat dissipation housing according to claim 2, wherein the buckling member comprises two positioning parts and at least one limiting part; the two positioning parts respectively correspond to the two positioning members on the two opposite side edges of each of the first openings and are buckled with the positioning bump; the limiting part is connecting with the two positioning parts; each of the heat dissipating members is disposed between the two positioning parts and is disposed between the limiting part and each of the second openings.

5. The heat dissipation housing according to claim 4, wherein each of the positioning parts comprises a positioning gap buckled with the positioning bump.

6. The heat dissipation housing according to claim 5, wherein each of the positioning parts abuts against the disposing surface; at least one of the positioning gaps is disposed on an edge of the positioning part away from the disposing surface.

7. The heat dissipation housing according to claim 4, wherein each of the heat dissipating members comprises a limiting groove; the limiting part passes through the limiting groove.

8. The heat dissipation housing according to claim 1 further comprising a plurality of partition plates disposed in the accommodating space of the housing body.

9. The heat dissipation housing according to claim 8, wherein each of the partition plates comprises a plurality of securing parts; the plurality of the securing parts pass through the housing body and are secured on the disposing surface between the two adjacent first openings.

10. The heat dissipation housing according to claim 9, wherein the component body of the positioning component further comprises a plurality of retaining holes corresponding to the plurality of securing parts; the plurality of securing parts pass through the plurality of the retaining holes.

11. The heat dissipation housing according to claim 1, wherein the opening area of each of the second openings is greater than the opening area of each of the first openings.

12. An electrical connector module, comprising:
  a heat dissipation housing according to claim 1; and
  a plurality of electrical connectors disposed in the accommodating space of the housing body, the plurality of electrical connectors respectively corresponding to the plurality of first openings;
  wherein the plurality of heat dissipating members are in thermal contact with the plurality of electrical connectors through the plurality of first openings and the plurality of second openings.

13. The heat dissipation housing according to claim 12 further comprising a circuit board on which the metal housing is disposed, the plurality of electrical connectors are electrically connected to the circuit board.

\* \* \* \* \*